United States Patent
Mazzei

(10) Patent No.: US 7,452,111 B2
(45) Date of Patent: Nov. 18, 2008

(54) VARIABLE FOCUSING PARABOLIC REFLECTIVE LIGHTING SYSTEM

(75) Inventor: Marco Mazzei, Boulder, CO (US)

(73) Assignee: Ecce Lux Inc., Boulder, CO (US)

( * ) Notice: Subject to any disclaimer, the term of this patent is extended or adjusted under 35 U.S.C. 154(b) by 85 days.

(21) Appl. No.: 11/506,408

(22) Filed: Aug. 18, 2006

(65) Prior Publication Data

US 2007/0041201 A1    Feb. 22, 2007

Related U.S. Application Data

(60) Provisional application No. 60/709,375, filed on Aug. 18, 2005.

(51) Int. Cl.
*F21V 1/00* (2006.01)
(52) U.S. Cl. ....................... 362/346; 362/341
(58) Field of Classification Search ................. 362/320, 362/292, 278
See application file for complete search history.

(56) References Cited

U.S. PATENT DOCUMENTS

| | | | |
|---|---|---|---|
| 923,542 A | 6/1909 | Losey | |
| 1,654,974 A * | 1/1928 | Johnson | 362/292 |
| 2,205,860 A | 6/1940 | Olds | |
| 2,586,583 A * | 2/1952 | Wagner | 362/346 |
| 2,806,134 A | 9/1957 | Tarcici | |
| 4,187,531 A | 2/1980 | Lowell et al. | |
| 4,855,884 A * | 8/1989 | Richardson | 362/278 |
| 5,198,832 A | 3/1993 | Higgins | |
| 5,451,975 A | 9/1995 | Miller | |
| 5,841,146 A | 11/1998 | Briese | |
| 6,024,469 A * | 2/2000 | Greif | 362/346 |
| 6,464,378 B1 * | 10/2002 | Reed et al. | 362/320 |
| 6,625,288 B1 | 9/2003 | Koizumi | |

OTHER PUBLICATIONS

Printout from website: www.bron.ch/br_home_en/index.php (Bron Elektronik AG) for product "Umbrella Para 170 FB", printed Oct. 30, 2006.

* cited by examiner

*Primary Examiner*—Anabel M Ton
(74) *Attorney, Agent, or Firm*—Jennifer L. Bales; Macheledt Bales & Heidmiller LLP

(57) ABSTRACT

A lighting system includes a bright bulb installed in front of a variable reflector assembly comprising a plurality of leaves. The leaves have some overlap and are pivotally attached near the base of the bulb, so that they can be collapsed inward or expanded outward in tandem by a mechanism. A baffle and light shield enclose and protect the bulb, and result in controllable and variable indirect lighting from the bulb.

16 Claims, 3 Drawing Sheets

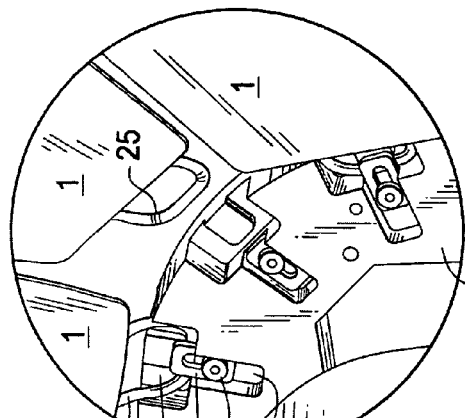
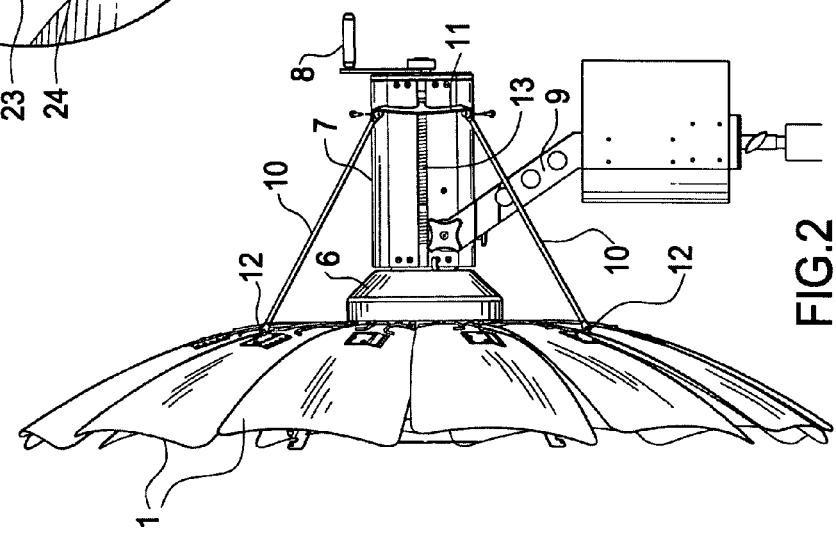
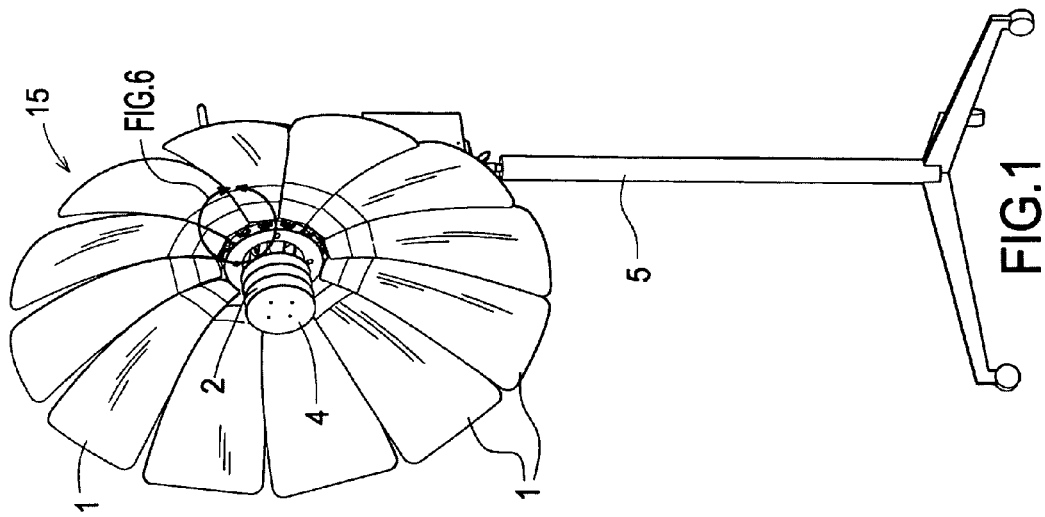

VARIABLE FOCUSING PARABOLIC REFLECTIVE LIGHTING SYSTEM

BACKGROUND OF THE INVENTION

This application claims the benefit of U.S. Provisional Patent Application No. 60/709,375, filed Aug. 18, 2005, and incorporates it by reference.

FIELD OF THE INVENTION

This invention relates to variable focusing parabolic reflective lighting systems for photography. In particular, this invention relates to variable focus lighting systems having leaves for forming a collapsible parabola shape.

DESCRIPTION OF RELATED ART

Reflectors are used to achieve lighting effects in photography, including still photography, motion picture filming, television filming, and the like. Designs for collapsible reflectors for bouncing light into reflectors and achieving a soft indirect effect date to 1909 with U.S. Patent No. 923,542 to Losy, in which an umbrella like structure containing ribs covered with fabric was used as a surface into which to bounce light. Similar designs have improved the construction of light source and umbrella units, such as in U.S. Patent No. 4,187,531 to Lowell. Such systems, though lightweight and functional, offer extremely limited adjustability of the focus of light in shape and intensity. One design attempts this by moving the light source back and forth within an umbrella reflector to achieve a range of focal lengths, as taught in U.S. Patent No. 5,841,146 to Briese.

Furthermore such umbrella systems are not rugged enough for everyday motion picture and TV set work, as they are unstable in windy conditions, cannot withstand very high temperatures, and are made of delicate fabrics prone to rips and snags.

The other reflector type existent in the photography trade is the hard reflector type used in U.S. Pat. No. 2,205,860. This type of reflector has no adjustability as to the focal length of the light achieved. Other forms of reflectors are created as static reflectors, which fold in order only to be stored, not to alter their output. Such is the case with U.S. Pat. No. 2,806,134 wherein the reflector retracts into a foldable fan for storage, but has no functional use at intermediate positions.

Collapsible antenna dishes, such as those taught in U.S. Pat. Nos. 5,451,975, 5,198,832, and 6,625,288 are also known in the art. They are not used to generate different lighting focal lengths in order to controllably create different quality of light, quantity of light, and intensity of light for photography.

A need remains in the art for variable focussing parabolic reflective lighting systems for photography, which change their parabolic shape to provide a controllable and variable lighting effect.

SUMMARY

An object of the present invention is to provide variable focussing parabolic reflective lighting systems for photography, which change their parabolic shape to provide a controllable and variable lighting effect.

The lighting system of the present invention includes a bright bulb installed in front of a reflective element comprising a plurality of curved leaves forming a generally parabolic shape. The leaves have some overlap and are pivotally attached near the base of the bulb, so that they can be collapsed inward or expand outward, changing the parabolic shape. As the shape changes, the light from the bulb reflects off of different portions of the parabola in different amounts and is bounced toward the subject in a controllable fashion. The changing shape of the parabola causes the light to follow different pathways as it bounces inside the reflector before reaching the subject. When narrowly closed, the back of the reflector reflects the majority of the light and produces a very intense, concentrated cone of light. When widely open, the light is reflected from the entire reflector and produces a very soft, diffuse, and scattered bounce light. Altering the parabolic shape from a wide open, almost flat shape, through a variety of in between shapes, to a narrow, steeply curved shape, alters the focal length of the parabola, and hence alters the intensity, coverage, quality and quantity of light reflected onto the photographic subject.

Such an adjustable reflective lighting system might comprise a lighting element having a base and extending forward from the base, a reflective element including a plurality of curved leaves forming a generally parabolic shape, the leaves pivotally attached near the base, such that the leaves can open outward from the lighting element and close inward toward the lighting element, wherein each leaf overlaps a neighbor, such that the leaves collapse inward and open outward in tandem, and a control mechanism for selectively pushing at least some of the leaves forward to close the reflective element inward toward the lighting element and for selectively pulling the leaves backward to open them away from the lighting element.

The control mechanism might comprise linkage rods pivotally connected to some of the reflective leaves, a linkage rod connection element pivotally attached to the linkage rods, and a lead screw engaged with the connection element such that when the lead screw turns, the connection element moves forward or back, and an adjustment handle for turning the lead screw.

The reflective element might comprise approximately twelve leaves wherein approximately four leaves are selectively pushed and pulled. As a feature, a light shield is disposed in front of the lighting element and a baffle is disposed around the lighting element. These guide the light as well as protecting the bulb.

A lighting stand may be included, for adjusting the position of the lighting

The pivoting mechanism for rotating the leaves open and closed may include loops extending inward from the inside end of the leaves, and a leaf connection ring located around the lamp base and pivotally connected to the leaf loops. Channels in the connection ring seat the loops, and slidable washers selectively prevent the loops from coming out of the channels. Preferably the loops are formed from wires extending along the leaves to support the leaves and curving past the inside edges of the leaves to form the loops.

Thus, the mechanism for collapsing or expanding the reflective leaves might be an adjustment wheel driving a lead screw, where the lead screw moves linkage rods connected to some of the reflective leaves. The other leaves move because each leaf overlaps one of its neighbors, so that all of the leaves collapse or expand together.

BRIEF DESCRIPTION OF THE DRAWINGS

FIG. 1 is a front isometric view of a variable focus lighting system according resent invention, including its stand.

FIG. 2 is a side view of the reflector portion of the lighting device of FIG. 1, in a relatively open position.

FIG. 6 is a back close-up diagram showing how the leaves are connected to me in FIGS. 1-5.

DETAILED DESCRIPTION OF THE PREFERRED EMBODIMENTS

Figure 4:
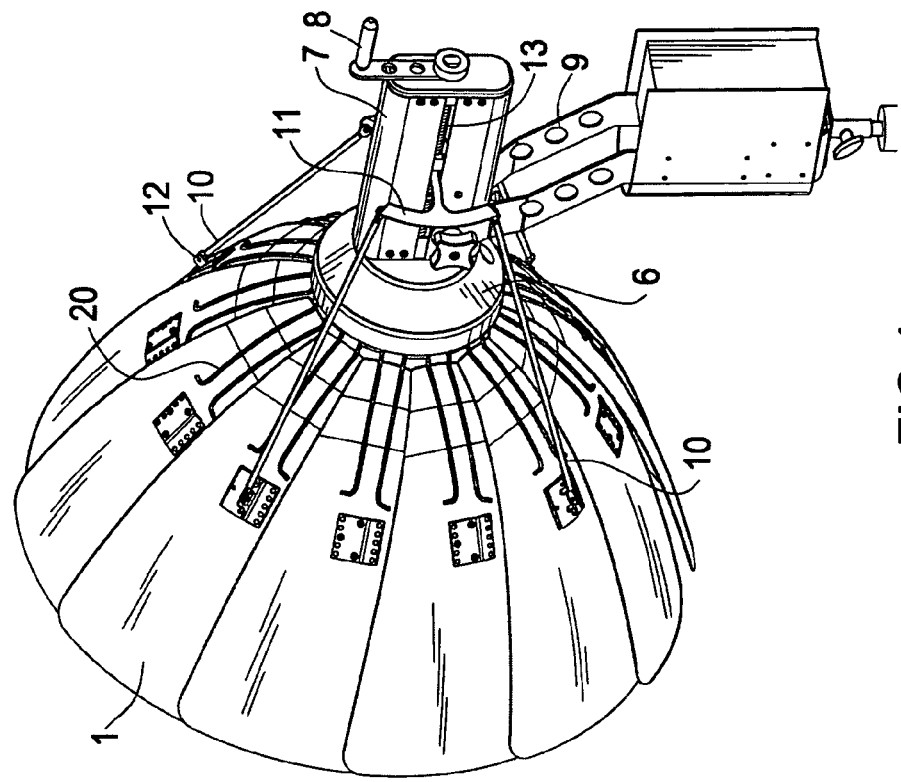
FIG. 4 is a back isometric view of the reflector portion of the lighting device FIG. 1.

The following table of reference numbers used herein are provided for convenience.

| | |
|---|---|
| 1 | leaves |
| 2 | baffle |
| 3 | lighting element |
| 4 | light shield |
| 5 | Reflector assembly stand |
| 6 | front portion of housing |
| 7 | back portion of housing |
| 8 | adjustment handle |
| 9 | mounting bracket |
| 10 | linkage rods |
| 11 | linkage rod connection element |
| 12 | linkage rod leaf connectors |
| 13 | lead screw |
| 14 | light source electronics |
| 15 | variable reflector assembly |
| 17 | leaf connection ring |
| 18 | lamp base |
| 20 | leaf support wire |
| 21 | wire loop support channel |
| 22 | wire retaining washer |
| 23 | tightening nut |
| 24 | washer retraction channel |
| 25 | wire loop |

FIG. 1 is a front isometric view of a variable focus lighting system according to the present invention, including its optional stand 5. Stand 5 is conventional and not described in detail. It will generally include such features as height adjustment and means to rotate the reflector assembly 15 from side to side, in order to direct the light toward a photographic subject.

Reflector assembly 15 is the heart of the present invention and is shown and described in detail in FIGS. 2 through 5 and associated description. Briefly, light source 3 (shown in FIG. 5) behind light shield 4 generates light, which passes through baffles 2 and is reflected off of leaves 1 onto the photographic subject (not shown). Baffles 2 and light shield 4 protect bulb 3 and prevent direct light from shining forward from light source 3.

Leaves 1 form a generally parabolic reflective surface, so that the light is directed forward onto the subject. Leaves 1 might be formed of a light, tough material such as a fiber based composite. The leaves are preferably covered with a reflective shiny silver-colored material, but could be other reflective colors and gloss levels as well. Leaves 1 are pivotally attached near the base of the bulb (see FIG. 6), so that they can be collapsed inward or expand outward, changing the parabolic shape. They are oriented such that each overlaps one of its neighbors, such that they open and close in tandem. Preferably the leaves form a full circle, so that there are no gaps.

Altering the parabolic shape from a wide open, almost flat shape, through a variety of in between shapes, to a narrow, steeply curved shape, alters the focal length of the parabola, and hence alters the intensity, coverage, quality and quantity of light reflected onto the photographic subject. One embodiment extends 36 inches in diameter when the leaves are extended. Other embodiments might be much smaller (such as a small reflector assembly formed primarily of light materials such as plastic for use with an electronic news gathering camera or the like) or much larger (such as a permanently installed reflector assembly).

The mechanism for collapsing or expanding the reflective leaves is shown in FIGS. 2-6. The preferred embodiment is an adjustment wheel or handle 8 driving a lead screw 13, where the lead screw moves linkage rod connection elements 11, and hence linkage rods 10 connected to some fraction of the reflective leaves 1. The other leaves move because each leaf overlaps one of its neighbors, so that all of the leaves collapse or expand together.

The embodiment of FIGS. 2-6 is manually operated by turning handle 8. As an alternative, the operation could be mechanized with the addition of a motor. The motor could be operated by remote control. This embodiment would be most convenient for use in permanently mounted reflector assemblies in theatres or the like.

FIG. 2 is a side view of the reflector assembly 15 in a relatively open position.

Figure 3:
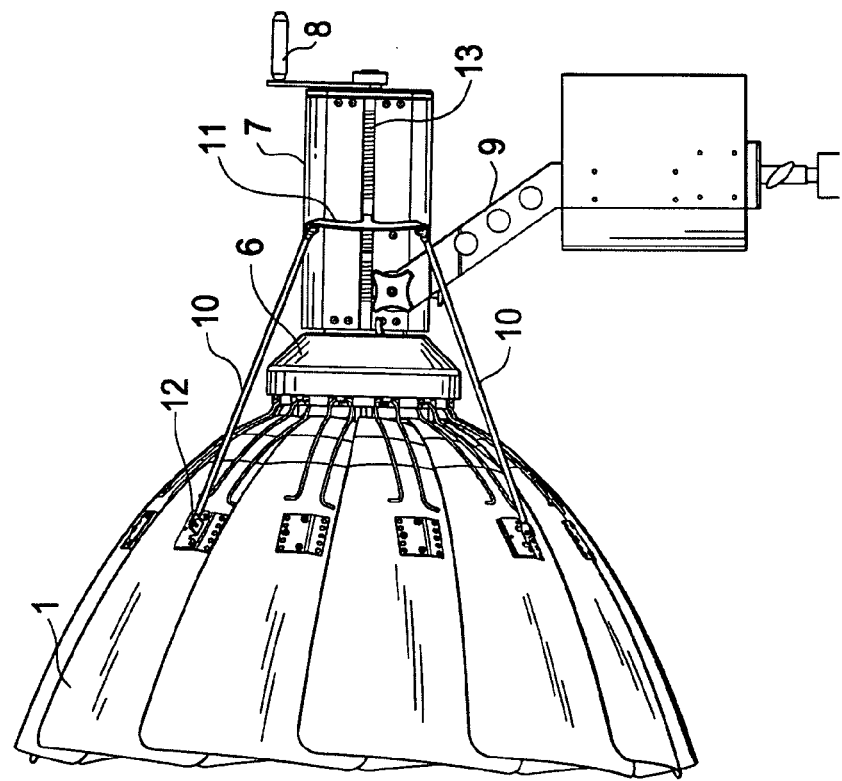
FIG. 3 is a side view of the reflector portion of the lighting device of FIG. 1, in a relatively closed position.

FIG. 3 is a similar view, where leaves 1 have been adjusted to a more closed position. In the embodiment of FIGS. 2 and 3, 12 leaves 1 are oriented such that each overlaps one of its neighbors, and they open and close in tandem. In this embodiment, leaves 1 are collapsed or expanded by four linkage rods 10, connected to four evenly spaced leaves 1 at linkage rod/leaf pivoting connection points 12. Connection rods 10 are translated via adjustment wheel 8, which turns lead screw 13 and moves linkage rod connection element 11. Connection element 11 is pivotally connected to linkage rods 10. When adjustment wheel 8 is turned clockwise, connection element 11 moves forward, driving linkage rods 10 forward, causing leaves 1 to collapse inward. When adjustment wheel 8 is turned counterclockwise, linkage rods 10 move backward, 20 causing leaves 1 to expand outward.

Back housing portion 7 encloses the mechanism for converting rotation of adjustment wheel 8 into translation of rods 10. As adjustment wheel 8 is rotated on a fixed plane in a clockwise direction it rotates lead screw 13, causing linkage rod connection element 11 to travel towards the back of housing portion 7. In this embodiment, linkage rod connection element 11 is threaded and fitted over lead screw 13, hence the forward/backward movement. Housing portion 7 also generally encloses the electronics 14 for lighting bulb 3. These elements may be seen in the exploded view of FIG. 5. Mounting bracket 9 connects reflector assembly 15 to stand 5 (see FIG. 1).

FIG. 4 is a rear isometric view of reflector assembly 15. The connection between rods 10, connection points 12, and leaves 1 is best shown in this figure. Linkage rods 10 are pivotally connected to connection points 12 on leaves 1. In this particular embodiment, variable reflector assembly 15 comprises 12 leaves, each pivotally connected to, for example, ring 17, within housing 7. Leaves 1 are pivotally connected to leaf connection ring 17, via loops 25 in support wires 20 (see FIG. 6). Linkage rods 10 connect to four evenly spaced leaves. Causing these four leaves to move results in the entire assembly moving in tandem, since leaves 1 overlap. In a preferred embodiment, all of the leaves 1 include connection points 12, because this makes the leaves interchangeable. The leaves are easily removed and replaced, as shown in FIG. 6.

Linkage rods 10 are also pivotally connected to linkage rod connection element 11, which moves forward and back as lead screw 13 is turned by handle 8.

Figure 5:
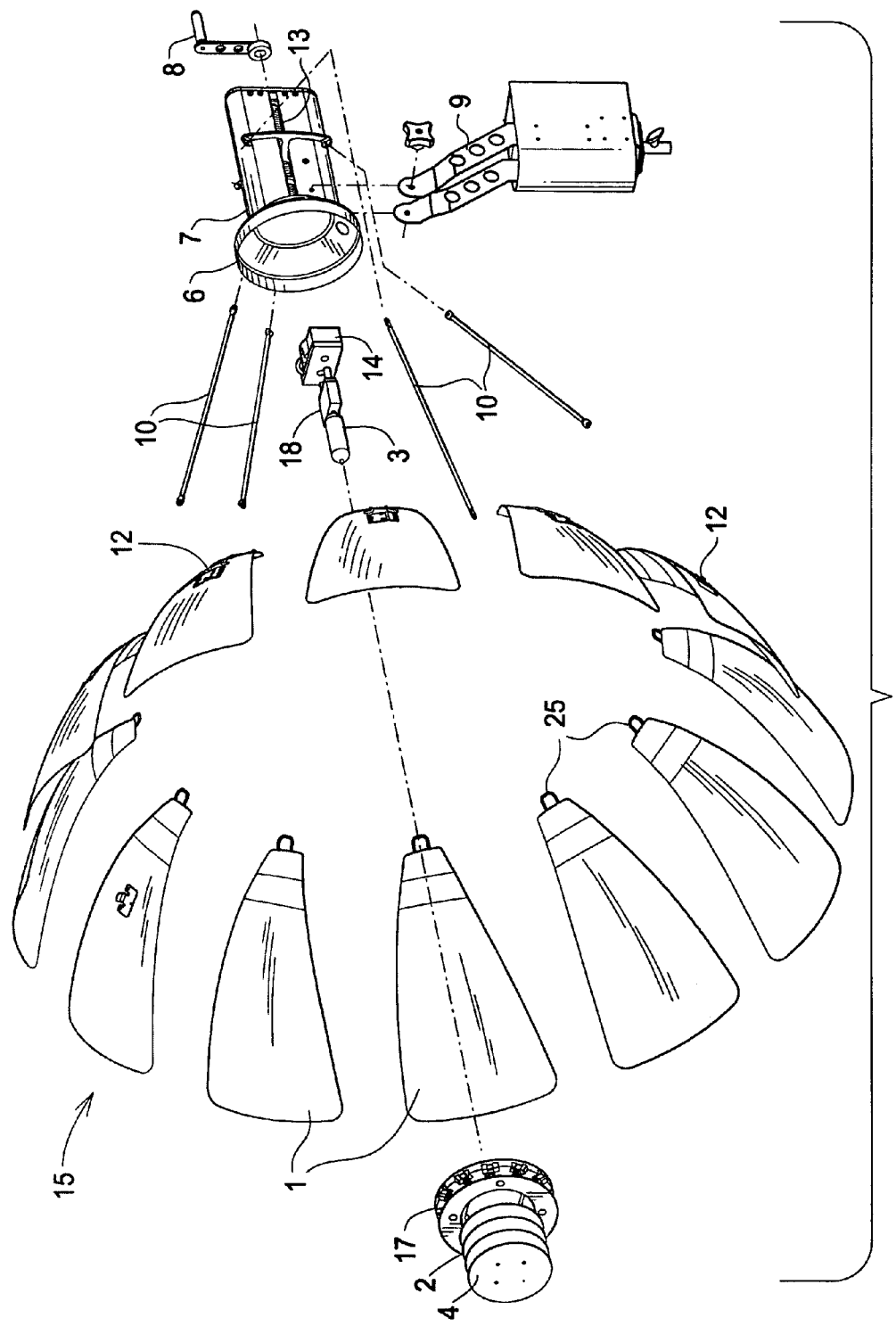
FIG. 5 is a somewhat simplified exploded isometric view of the reflector of the lighting device of FIG. 1.

FIG. 5 is a somewhat simplified exploded isometric view of reflector assembly 15. Many hardware and mounting elements have been removed for clarity.

Light shield 4 and baffle 2 surround and protect light source 3 (a bulb in this embodiment), and result in indirect lighting from bulb 3. Light shield 4 is opaque and blocks light from shining forward. Baffle 2 comprises flat (disc-shaped) rings surrounding bulb 3. The rings are black nonreflective metal, but have spaces between them allowing light to shine sideways and reflect off of leaves 1.

Many variations in this structure are possible. Light Shield 4 might be replaced by, for example, a grid diffuser. Baffle 2 might be transparent, or shiny (e.g. chromed) or form a wire grid instead of rings. A frosted bulb might be used as the light source and the light shield dispensed with.

Bulb 3 is attached to electronics 14 via lamp base 18 within rear housing 7, where it is powered. Rear housing 7 attaches to mounting bracket 9, used to mount reflector assembly 15 to, for example, stand 5. Linkage rods 10 attach to linkage rod connection element 11 which engages lead screw 13. Lead screw 13 extends forward from adjustment wheel 8 within rear housing 7. When adjustment wheel 8 is turned clockwise, lead screw 13 rod connection element 11 and hence linkage rods 10 to move forward, causing leaves 1 to collapse inward. When adjustment wheel 8 is turned counterclocklkwise, linkage rods 10 move backward, causing leaves 1 to expand outward.

FIG. 6 is a rear-view close-up diagram showing how leaves 1 are connected to leaf connection ring 17, within front housing portion 6. A variety of pivotal connection mechanisms will work, but the connection mechanism of FIG. 6 is advantageous in that leaves 1 may be easily removed and replaced.

Support wires 20 on leaves 1 extend inward beyond leaves 1, forming loops 25. When a leaf is installed, this loop 25 is seated in wire channel 21 on leaf connection ring 17. Then wire retaining washer 22 slides over the wire loop 25, locking it into wire channel 21. Tightening nut 23 prevents washer a 22 from sliding back inward.

To remove a leaf, nut 23 is loosened, washer 22 slides inward into washer retraction channel 24, and wire loop 25 may be lifted out from loop channel 21.

It will be appreciated by one versed in the art that there are many possible variations on these designs, but all are typified by adjustable reflector leaves to control light output. Some known and anticipated variations are described below:

Rather than a single incandescent bulb 3, the lighting element could comprise an array of surface mount white LEDs wrapped around a support structure of similar dimensions. A 2000 Watt bulb might be a cylinder of approximately 1.25" diameter and 4" length, which would require on the order of several hundred LEDs to match.

Further, multicolor LEDs or discrete LEDs of different colors could comprise the LED array to allow color effects. Another embodiment of the invention may use fluorescent tubes of varying lengths as the bulb light source. The light source could be a strobe light for still photography.

What is claimed is:

1. An adjustable reflective lighting system comprising:
   a lighting element having a base and extending forward from the base;
   a reflective element including
      a plurality of curved leaves forming a generally parabolic shape;
      the leaves pivotally attached near the base, such that the leaves can open outward from the lighting element and close inward toward the lighting element;
      wherein each leaf overlaps a neighbor, such that the leaves collapse inward and open outward in tandem; and
   a control mechanism for selectively pushing at least some of the leaves forward to close the reflective element inward toward the lighting element and for selectively pulling the leaves backward to open them away from the lighting element.

2. The system of claim 1 wherein the mechanism comprises:
   linkage rods pivotally connected to some of the reflective leaves;
   a linkage rod connection element pivotally attached to the linkage rods;
   a lead screw engaged with the connection element such that when the lead screw turns, the connection element moves forward or back; and
   an adjustment handle for turning the lead screw.

3. The system of claim 1 wherein the reflective element comprises approximately twelve leaves, and wherein approximately four leaves are selectively pushed and pulled.

4. The system of claim 1 further comprising a light shield disposed in front of the lighting element and a baffle disposed around the lighting element.

5. The system of claim 1 further comprising a lighting stand for adjusting the position of the lighting element and reflecting element.

6. The system of claim 1, wherein the reflective element further comprises:
   loops extending inward from the inside end of the leaves;
   a leaf connection ring located around the lamp base and pivotally connected to the leaf loops.

7. The system of claim 6 wherein the leaf connection ring further comprises:
   channels for seating the loops; and
   slidable washers for selectively preventing the loops from coming out of the channels.

8. The system of claim 6 wherein the loops are formed from wires extending along the leaves to support the leaves and curving past the inside edges of the leaves to form the loops.

9. The method of generating and adjusting light for shining on a photographic subject, the method comprising the steps of:
   providing a lighting element having a base and extending forward from the base;
   providing a reflective element including
      a plurality of curved leaves forming a generally parabolic shape;
      the leaves pivotally attached near the base, such that the leaves can open outward from the lighting element and close inward toward the lighting element;
      wherein each leaf overlaps a neighbor, such that the leaves collapse inward and open outward in tandem; and
   adjusting the lighting effect by either
      selectively pushing at least some of the leaves forward to close the reflective element inward toward the lighting element; or
      selectively pulling at least some of the leaves backward to open them away from the lighting element.

10. The method of claim 9 wherein the adjusting step comprises the steps of:
   pivotally attaching linkage rods to some of the reflective leaves; and forcing the linkage rods either forward or back.

11. The method of claim 10 wherein the step of forcing the linkage rods comprises the steps of:
   pivotally attaching the linkage rods to a connection element;
   engaging a lead screw with the connection element such that when the lead screw turns, the connection element moves forward or back; and
   turning the lead screw.

12. The method of claim 9 wherein the providing step provides approximately twelve leaves, and wherein the adjusting step either pushes or pulls approximately four leaves.

13. The method of claim 9 further comprising steps of providing a light shield disposed in front of the lighting element and providing a baffle disposed around the lighting element.

14. The method of claim 9, wherein the providing step further comprises the steps of:
   extending a loop inward from each leaf;
   providing a leaf connection ring located around the lamp base;
   pivotally connecting the loops to the connection ring.

15. The method of claim 14 wherein the step of providing a leaf connection ring further comprises the step of forming channels in the ring sized for inserting the loops.

16. The method of claim 15 wherein the step of providing a leaf connection ring further comprises the step of providing a slidable washer for selectively preventing the wire ring from coming out of the channel.

* * * * *